J. P. SCHMAND.
TIRE.
APPLICATION FILED OCT. 19, 1910.
992,604.
Patented May 16, 1911.
2 SHEETS—SHEET 2.
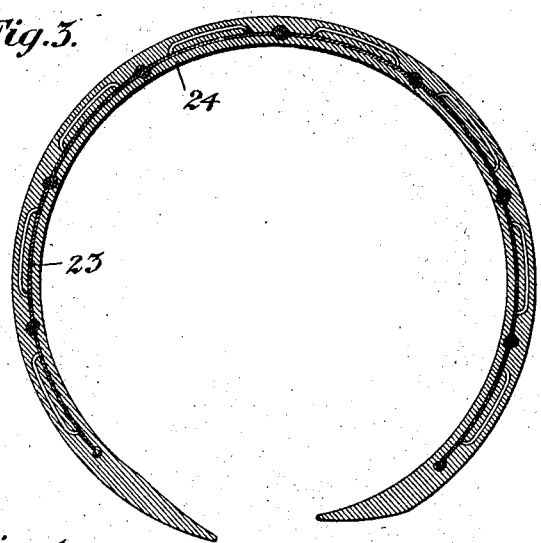
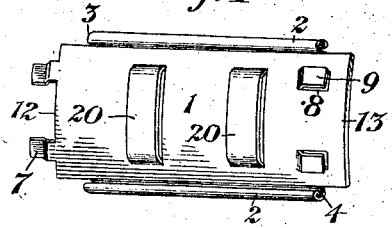
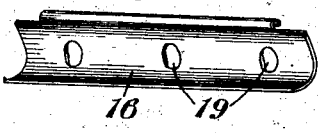
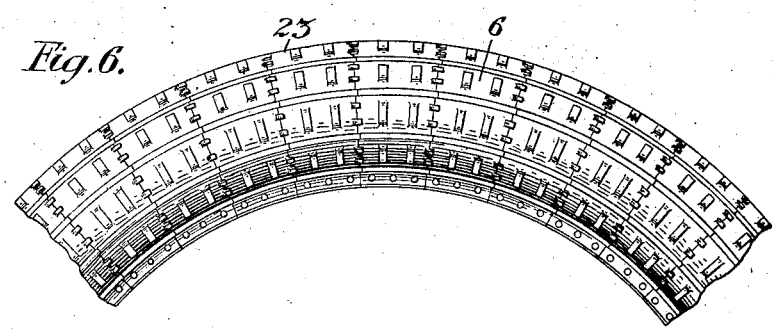
Witnesses:
M. Levy
Inventor
Joseph Phillip Schmand
By his Attorneys

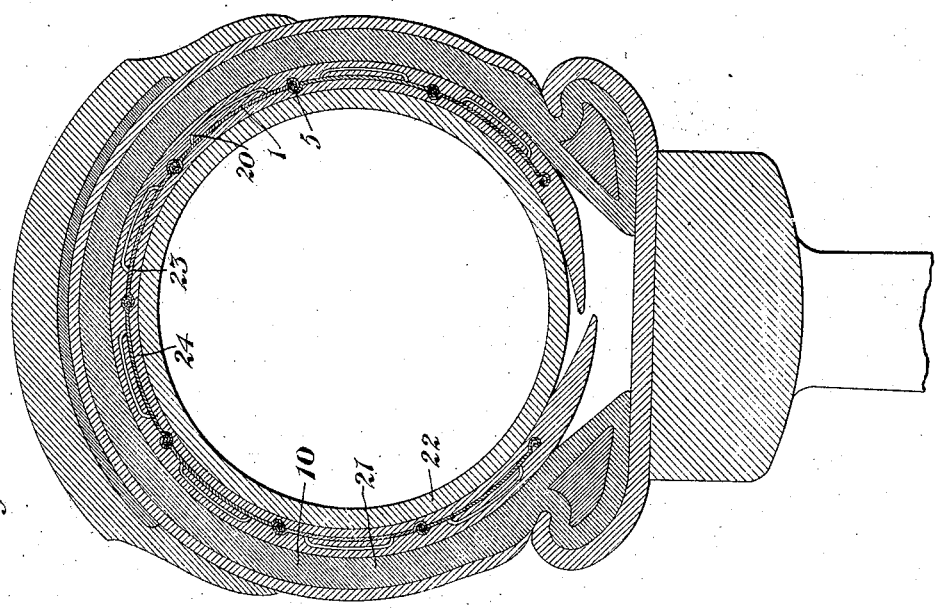
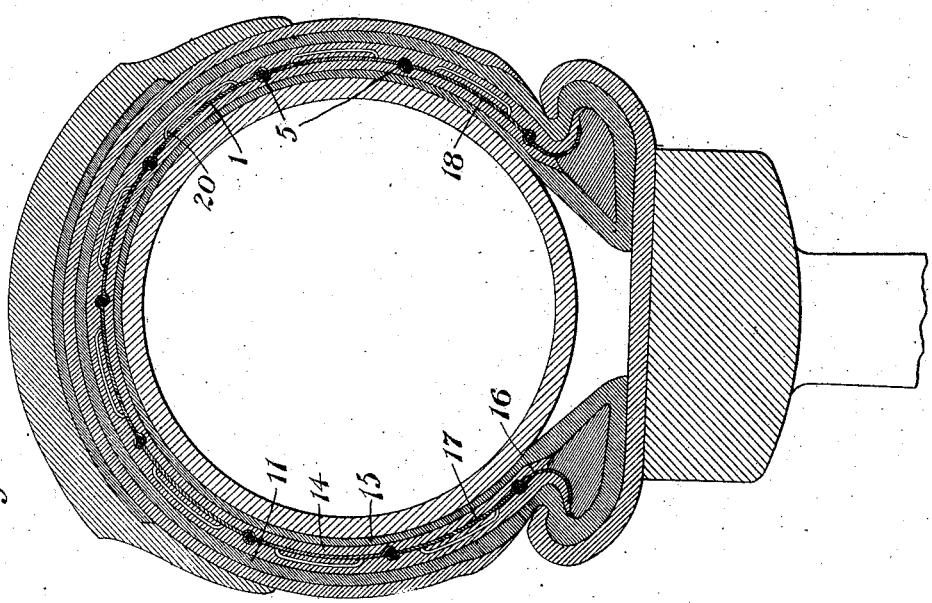

UNITED STATES PATENT OFFICE.

JOSEPH PHILLIP SCHMAND, OF ROSELLE PARK, NEW JERSEY.

TIRE.

992,604.  Specification of Letters Patent.  Patented May 16, 1911.

Application filed October 19, 1910. Serial No. 587,878.

*To all whom it may concern:*

Be it known that I, JOSEPH PHILLIP SCHMAND, a citizen of the United States, residing at Roselle Park, in the county of Union and State of New Jersey, have invented certain new and useful Improvements in Tires; and I do hereby declare the following to be a full, clear, and exact description of the invention, such as will enable others skilled in the art to which it appertains to make and use the same.

This invention relates to wheel tires for vehicles and particularly to pneumatic rubber tires as are generally used on automobile wheels.

At the present time the wheels used on automobiles have pneumatic tires to give resiliency and to absorb the shocks received by the wheels from the unevenness of the roads. The rubber tires however constantly give trouble by being punctured, thus causing delay, annoyance and many other inconveniences.

The object of my invention is to provide an improved wheel tire that will prevent such possibility of puncturing; my tire being of substantially the same construction as the pneumatic tires ordinarily used but provided with a layer of linked armor interposed between the layers constituting the structure of said tire and encircling the tire between said layers transversely, said linked armor being thoroughly flexible and adapting itself to and receiving shocks incurred on the road in the same manner as the rubber structure which incloses it, so that the ordinary resiliency possessed by the rubber structure is not affected.

The improvements provided herein are also simple, of inexpensive construction and result in a wheel tire that entails all the advantages of the ordinary pneumatic tire without however possessing its disadvantage of being punctured.

My invention consists of the parts and combinations hereinafter fully described and claimed.

In the accompanying drawings, Figure 1 is a transverse section of an assembled wheel tire constructed with my improvements and Fig. 2 is a modification of the same, showing my improvements as adapted to a wheel tire of ordinary construction. Fig. 3 is a detail of said adapted improvement, and Fig. 4 is a detail in perspective of one of the links constituting the structure of the armor. Fig. 5 is a longitudinal section of Fig. 4, but showing two such links as fitting endwise. Fig. 6 is a view in a reduced scale showing the manner of assembling the links in constructing the armor, and Fig. 7 is a detail in perspective of the last link as shown in section in Fig. 1.

Similar reference characters refer to similar parts in the different views of the drawings.

The layer of armor used in this wheel tire is constructed entirely of the link plates 1, Fig. 4. Said links are preferably punched out of steel plates and are joined sidewise by being hinged together. The sides 2 of the links are hook-shaped longitudinally and the links are joined by placing the end 3 of one against the end 4 of another link and passing one hook within another longitudinally to hinge the two as shown at 5 in Figs. 1, 2, and 3. Several links are thus hinged together to go around the tire transversely as shown in section in Fig. 3 and constitute a chain which forms one series, as shown at 6, Fig. 6; said chain series being placed end to end to make up the entire ring of armor to go around the tire. Each series of links is joined to the other by the projections 7 of the link plates 4 passing through the punched holes 8 of the links in the next series and the projections 9 pressing down on the adjoining links while the projections 7 press upward on their adjoining links as shown in Fig. 5. In this manner, each series is joined to the next until the entire ring is completed to fill the tire as will be shown later.

It will be noted that the link plates are convex to conform to the convexity of the transverse and circumferential section of the tire and that the ends 12 and 13 of the links are tapered radially toward the center of the wheel; in other words each link in the series is formed to fit the sectional surface over which it extends.

The ordinary tire is constructed as shown in Fig. 2, where the layer 10 is a mixture of fabric and rubber, and in the application of my invention it is preferable to separate said layer, forming the layers 11 and 15 as in Fig. 1, and insert therein the aforedescribed armored ring to extend within the entire tire, after which the space 14 between said layers 11 and 15, forming a mold, may be filled with rubber, cast therein and vulcanized, thereby retaining said armored ring and solidifying the entire structure of the tire. In this form it is preferable to hinge a bent plate 16, to the last links 17 and 18 in order to give the rubber at that place a better hold on the ring. For this reason the holes 19 are provided in plate 16 to allow the rubber to pass through, which is also the object of providing the raised punched projections 20 on the links.

Where it is desired to adapt this improvement to a tire that is already being used, the aforesaid armored ring may be cast around with a layer of vulcanized rubber as shown in Fig. 3 to constitute an independent rubber ring with said armored ring contained within. This rubber ring is then placed in the tire and disposed between the external ring 21 and the pneumatic ring 22 so that this arrangement makes such tire serve the same purpose as the special tire shown in Fig. 1.

If some object on the road, such as a lump of glass or sharp stone, should be struck by the ordinary tires, the object would cause said tires to be penetrated and punctured. However, in an automobile equipped with my improved tires, this same obstacle if encountered would pass through the outer ring 21 but would strike the interposed metallic armored ring which would prevent the pneumatic ring 22 from being reached, and thereby preventing the puncturing of the tire.

It will be evident from the structure of the armored tire that since it is composed of a plurality of link-plates, comparatively small, and hinged sidewise to constitute a series, and since each series is joined to the next to move freely, it would result in making the armored ring thoroughly flexible, after it has been built into the tire as described, so that the armored tire would naturally give way to shocks and be as resilient as the tire was previously to the introduction of my improvements and thus said armored ring would not in any way affect the natural resilient action of the material into which it is built.

It must be understood that my invention is not to be limited to the specific form of construction and arrangement as shown and described here, but that variations may be made in practice without however departing from the spirit and principles of my invention.

Having thus described my invention, I claim:—

In an armored wheel tire, a body portion and a layer of metal within said body portion consisting of a plurality of links each formed with a laterally extending curved member arranged to engage a similar curved member carried by an adjoining link and providing means for hinging the links in transverse series, each link having a slot in one end, a link engaging tongue projecting from the edge of the slot, and a tongue projecting from the opposite end of the link, arranged to pass through the slot of an adjacent link and overlap a portion of the body thereof, providing means for hinging the links at their end portions.

In testimony whereof I affix my signature in presence of two witnesses.

JOSEPH PHILLIP SCHMAND.

Witnesses:
 B. ROMAN,
 HUGO MOCK.